Dec. 5, 1944.                C. H. WHITE                2,364,411
                         DIFFERENTIAL GEAR
                       Filed Jan. 21, 1943            2 Sheets-Sheet 1
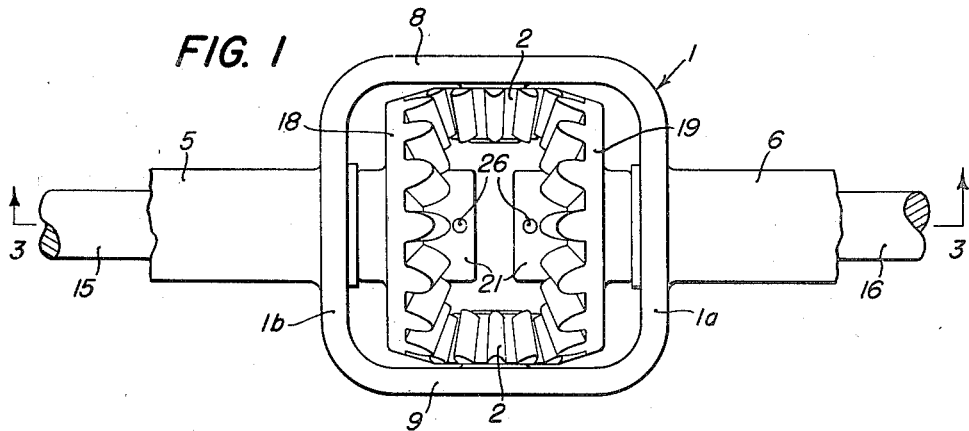
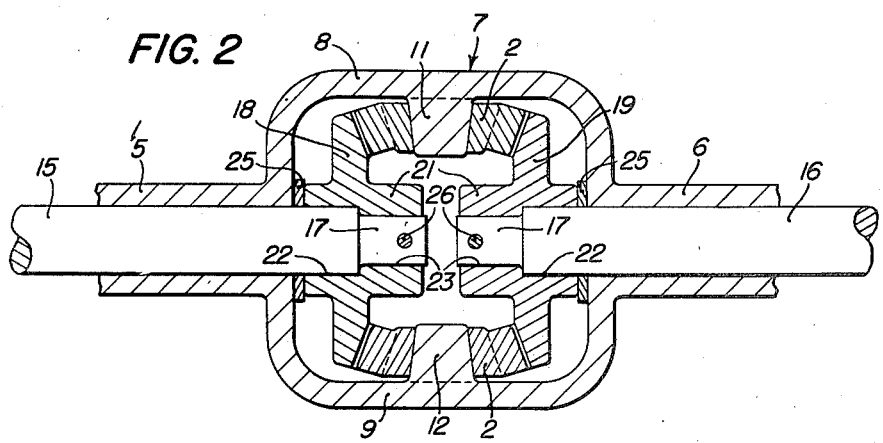
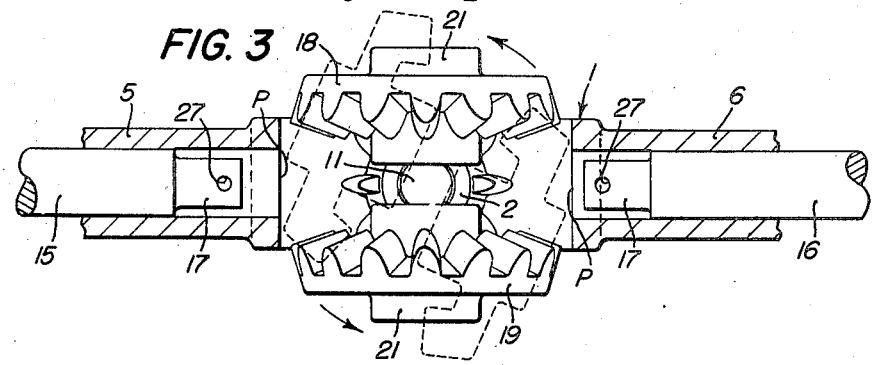
INVENTOR
CHARLES H. WHITE
BY
ATTORNEYS Dec. 5, 1944.   C. H. WHITE   2,364,411
DIFFERENTIAL GEAR
Filed Jan. 21, 1943   2 Sheets-Sheet 2

INVENTOR
CHARLES H. WHITE
BY
ATTORNEYS

Patented Dec. 5, 1944

2,364,411

UNITED STATES PATENT OFFICE 2,364,411

DIFFERENTIAL GEAR

Charles H. White, Moline, Ill., assignor to Deere & Company, Moline, Ill., a corporation of Illinois Application January 21, 1943, Serial No. 473,136

6 Claims. (Cl. 74—311)

This application is a continuation in part of my co-pending application, Serial No. 385,977, filed March 31, 1941.

The present invention relates generally to agricultural implements and more particularly to planters.

The object and general nature of the present invention is the provision of improved differential means for deriving power from both ground wheels of the planter for driving the power lift mechanism of the latter. More particularly, it is a feature of this invention to provide a simple sturdy differential gearing in which assembly is easily and quickly accomplished with substantially all extraneous keys, pins, locking nuts and the like eliminated. Specifically, it is a feature of this invention to provide a differential yoke having integral or fixed pinion studs and shaft-receiving sleeve sections, and it is an additional feature of this invention to provide for holding the pinions in place solely by the differential gears and to improve and simplify the assembly of the differential gears, pinions and shafts.

These and other objects and advantages of the present invention will be apparent to those skilled in the art after a consideration of the following detailed description, taken in conjunction with the accompanying drawings illustrating the preferred structural embodiment of this invention.

In the drawings:

Figure 1 is a plan view of a differential assembly that preferably is disposed between the two countershaft sections which form a part of the means for driving the lifting means from the ground wheels of the planter;

Figure 2 is a longitudinal sectional view;

Figure 4:
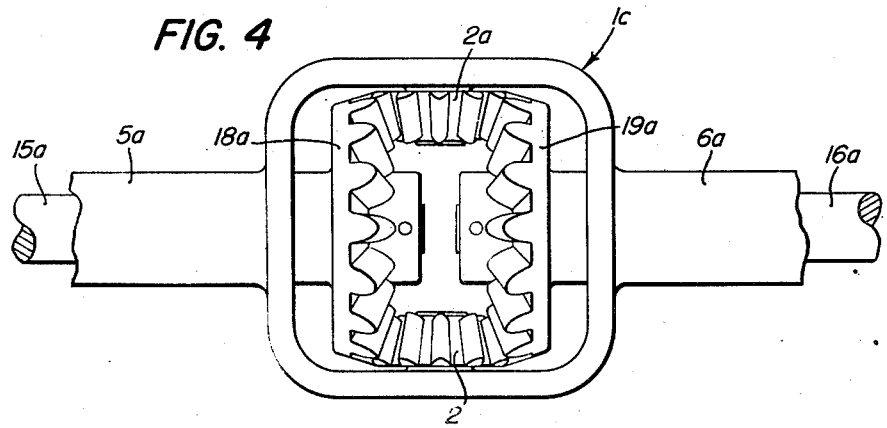
Figure 5:
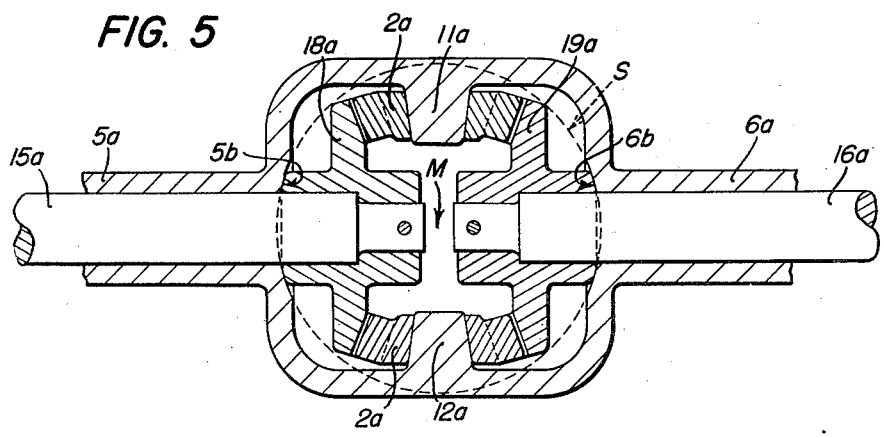
Figure 6:
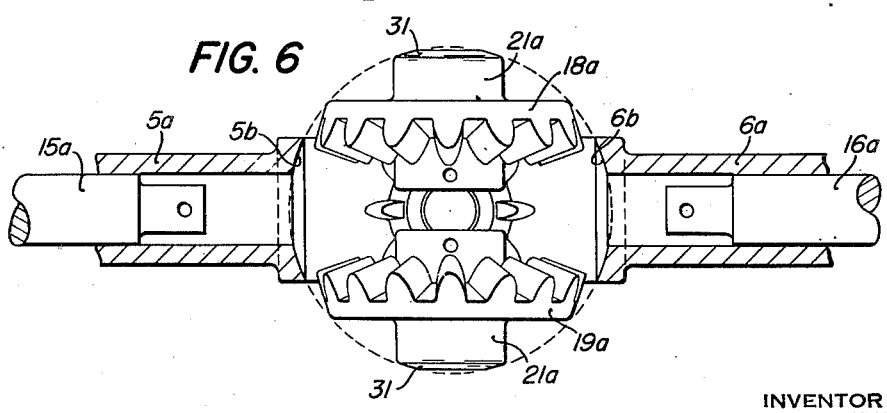

Figure 3 is a view taken generally along the line 3—3 of Figure 1, but with the differential gears in a different position so as to show the means of assembling the differential gears; and Figures 4, 5 and 6 are views similar, respectively, to Figures 1, 2 and 3, showing a modified form of this invention.

Referring first to Figures 1–3, the differential means is illustrated as comprising an integral yoke 1, preferably a casting, which serves as a gear carrier for a pair of planet pinions 2. As best shown in Figure 2, the yoke 1 includes a pair of sleeves 5 and 6 connected by a yoke section 7. The latter includes two side portions 8 and 9 which have pinion-receiving lugs 11 and 12 on which the pinions 2 are adapted to be mounted. A pair of shafts 15 and 16 are disposed in the sleeves 5 and 6, and the inner end of each shaft has a squared portion 17. A pair of differential gears 18 and 19 complete the differential, each of the gears 18 and 19 having a hub 21 one portion 22 of which is round to receive the associated shaft and the other portion 23 of which is square to receive the squared end 17 of the associated shaft when the parts are in assembled relation.

As more clearly disclosed in the parent application, identified above, the yoke 1 constitutes a driven member, connected to operate the lifting clutch and other parts of the planter, the yoke 1 being driven by means of the above described differential gearing from the two shafts 15 and 16 which, in this arrangement, constitute the driving shafts. As disclosed in the parent application, the driving shafts 15 and 16 are driven by suitable connections from the ground wheels of the planter. It is to be understood, of course, that so far as the differential gearing constituting the subject matter of the present invention is concerned, the member or yoke 1 may be the driving member and the shafts 15 and 16 driven members, or, any one or two of the three members, namely, the yoke 1, the shaft 15, and the shaft 16, may be the driving member or members and the other the driven member or members.

The method of assembling the differential is as follows: The two planet pinions 2 are mounted on their respective pivot studs 11 and 12. Next, the two bevel gears 18 and 19 are placed in mesh with the pinions 2 with one gear 18 above the central opening in the gear carrier 1 and with the other gear 19 below the opening, as shown in Figure 3. Then the two gears 18 and 19 are rocked or rolled, say in the direction of the arrow in Figure 3, about the axis defined by the studs 11 and 12 into position with the hubs 21 of the gears 18 and 19 in line with the sleeves 5, 6. In the event that the space between the end walls 1a and 1b of the yoke 1 is slightly smaller than the diametrically outermost portions of the assembled gears 18 and 19, they still may be rocked or swung into position within the yoke 1 by grasping the two gears 18 and 19 and, using one of the pinions as a fulcrum, rotating the gears in opposite directions so as to temporarily dispose them in offset position, as shown in dotted lines in Figure 3, this being permitted by the looseness between the teeth of the pinions and the teeth of the gears. Thereupon the gears may be brought to a position within the yoke 1, after which the gears 18 and 19 are rotated in opposite directions into a position in which the hubs line up with the sleeves 5 and 6.

Lastly, the two shafts 15 and 16 are inserted or passed through the respective sleeves 5 and 6 and into the hubs 21 of the bevel gears 18 and 19, the square portions 23 of the gears receiving the square ends 17 of the shafts 15 and 16. The position of the gears 18 and 19 just before they reach their final position is shown in Figure 3 in dotted lines, from which it will be seen that at points P the outer edges of the gear hubs 21 just clear the walls of the yoke section 8 when rocking or rolling the gears into position. This requirement for clearances at P makes it necessary to place washers 25 between the outer ends of the gear hubs 21 and the adjacent portions of the yoke section 7 so as to take up this clearance when the gears reach their final position and hold the gears 18 and 19 in mesh with the pinions 2. The washers 25 preferably are hardened to serve as thrust bearings. By this means driving connection is established without any other parts. When once the parts are in position as just described, they are completely assembled without the use of any other fastening means except that, if desired, pins 26 may be used to hold the shafts 15 and 16 against outward displacement relative to the gears 18 and 19, the pins being insertible through holes in the gear hubs into holes 27 in the squared shaft ends 17.

A modified form of the invention is shown in Figures 4-6 which is similar to the form just described except that by making the outer ends of the gear hubs and the cooperating faces of the yoke spheroidal in shape, the thrust washers may be eliminated.

Referring now to Figures 4-6, the yoke 1c receives shafts 15a and 16a and has sleeve sections 5a and 6a, the inner portions of which have faces 5b and 6b that lie in the surface of a sphere S whose center coincides with the midpoint M between the shaft ends. The inner squared ends of the shafts 15a and 16a receive gears 18a and 19a. The yoke 1c has studs 11a and 12a on which pinions 2a are mounted. The outer ends of the gear hubs 21a are spheroidal, as indicated at 31 (Figure 6), and conform to the spheroidal curvature of the faces 5b and 6b. Hence, when the gears 18a and 19a are rolled or rocked into position the spheroidal surfaces 5b, 6b, 31, see Figure 6, move into nested relation, see Figure 5, to receive the shafts 15a and 16a whereby the gears are held or locked in assembled relation without washers or the like.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement, differential mechanism comprising a means serving as an integral gear carrier open at its central portion and having inwardly directed opposed studs and aligned outwardly extending sleeves extending at right angles to a line connecting said studs, pinions adapted to be placed on said studs, a pair of bevel gears, each having a shaft-receiving hub, adapted to be meshed with said pinions, one at each side of the open central part of said carrier, the distance between the inner ends of said sleeves being sufficient to permit said gears to be rotated bodily about the axis of said studs so as to bring the hubs of said gears into line with said sleeves, and a pair of shafts adapted, respectively, to be inserted through said sleeves and into the hubs of said gears so as to hold the latter in position in said carrier.

2. In an agricultural implement, differential mechanism comprising a means serving as an integral gear carrier open at its central portion and having inwardly directed opposed studs and aligned outwardly extending sleeves extending at right angles to a line connecting said studs, pinions adapted to be placed on said studs, and a pair of bevel gears, each having a hub, adapted to be meshed with said pinions, one at each side of the open central part of said carrier, the distance between the inner ends of said sleeves being sufficient to permit said gears to be rotated bodily about the axis of said studs so as to bring the hubs of said gears into line with said sleeves.

3. In an agricultural implement, differential mechanism comprising a means serving as an integral gear carrier open at its central portion and having inwardly directed opposed studs and aligned outwardly extending sleeves extending at right angles to a line connecting said studs, pinions adapted to be placed on said studs, a pair of bevel gears, each having a hub, adapted to be meshed with said pinions, one at each side of the open central part of said carrier, the distance between the inner ends of said sleeves being sufficient to permit said gears to be rotated bodily about the axis of said studs so as to bring the hubs of said gears into line with said sleeves, and thrust washers adapted to be disposed between the outer end of each gear hub and the adjacent inner end of the associated gear carrier sleeve to close the space therebetween.

4. In an agricultural implement, differential mechanism comprising a means serving as an integral gear carrier open at its central portion and having inwardly directed opposed studs and aligned outwardly extending sleeves extending at right angles to a line connecting said studs, pinions adapted to be placed on said studs, a pair of bevel gears, each having a hub, adapted to be meshed with said pinions, one at each side of the open central part of said carrier, the teeth on said pinions and intermeshing gears being sufficiently loose to permit said bevel gears to be rotated a part of a revolution in opposite directions so as to occupy offset positions and the distance between the inner ends of said sleeves being sufficient, when the bevel gears are rocked on said pinions to said offset positions, to permit said gears to be shifted generally about the axis of said studs so as to bring the hubs of said gears into line with said sleeves, and a pair of shafts adapted, respectively, to be inserted through said sleeves and into the hubs of said gears.

5. In an agricultural implement, differential mechanism comprising a means serving as a generally ring-like gear carrier open at opposite sides and having inwardly directed opposed studs and aligned shaft-receiving openings the axis of which extends at right angles to a line connecting said studs, pinions adapted to be placed on said studs, a pair of bevel gears adapted to be meshed with said pinions, one at each side of the open central part of said carrier, the distance between the opposite wall sections of said carrier having said openings being sufficient to permit said gears and pinions being rocked generally about the axis of said studs into a position within the carrier and in alignment with said shaft-receiving openings, and a pair of shafts adapted, respectively, to be inserted through said openings and connected with said gears.

6. In an agricultural implement, differential mechanism comprising a means serving as an integral gear carrier open at its central portion and having inwardly directed opposed studs and aligned outwardly extending sleeves extending at right angles to a line connecting said studs, pinions adapted to be placed on said studs, and a pair of bevel gears, each having a hub, adapted to be meshed with said pinions, one at each side of the open central part of said carrier, the distance between the inner ends of said sleeves being sufficient to permit said gears to be rotated bodily about the axis of said studs and the outer ends of said hubs and the adjacent portions of the inner ends of said sleeves being spherical so as to accommodate the bodily rotation of said gears into position in said carrier with the hubs of said gears in line with said sleeves.

CHARLES H. WHITE.